Sept. 2, 1941.   T. C. GALLAGHER   2,254,647
VEHICLE WINDOW SHADE
Filed May 8, 1940   2 Sheets-Sheet 1
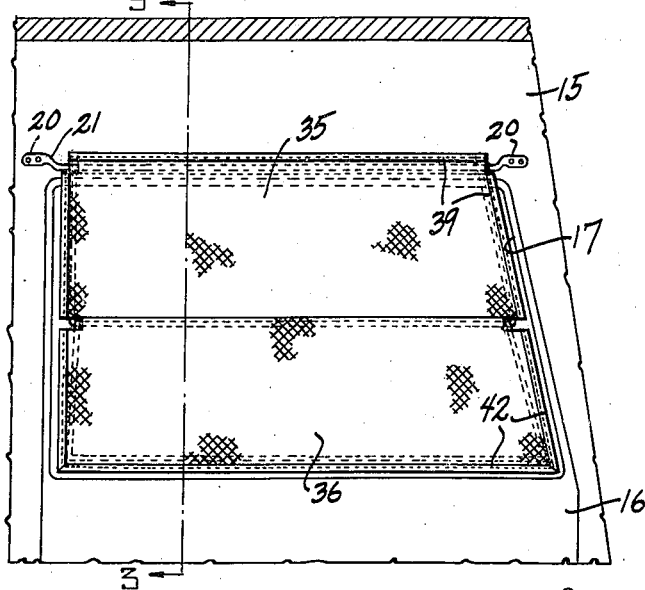
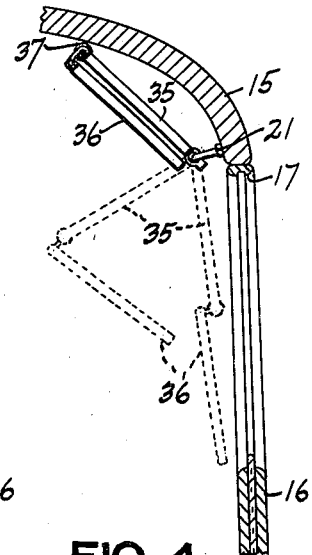
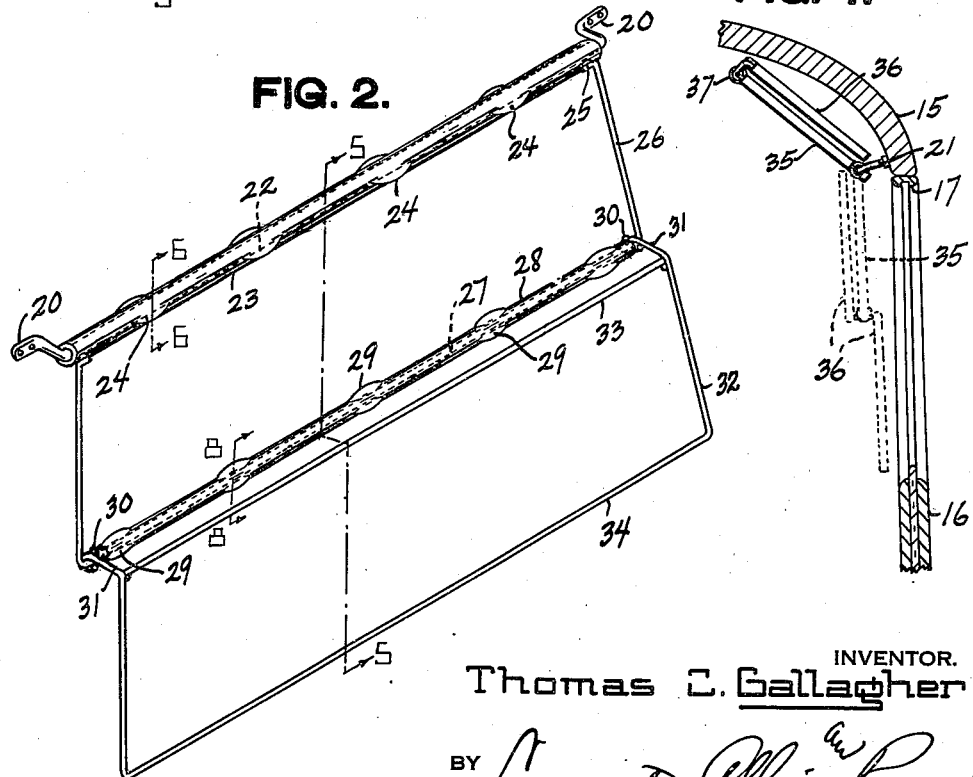
INVENTOR.
Thomas C. Gallagher
BY
ATTORNEYS.

Sept. 2, 1941.   T. C. GALLAGHER   2,254,647
VEHICLE WINDOW SHADE
Filed May 8, 1940   2 Sheets-Sheet 2
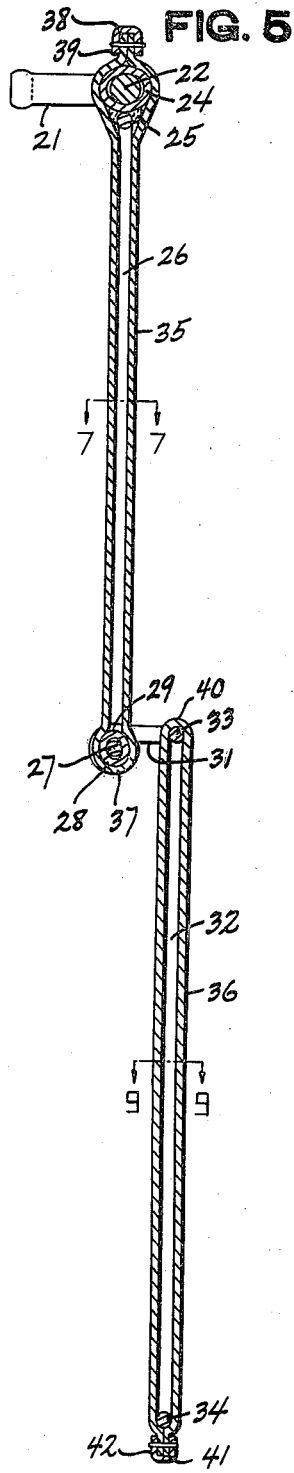
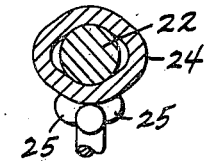
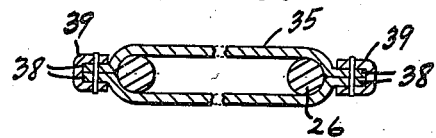
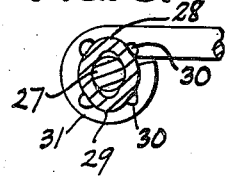
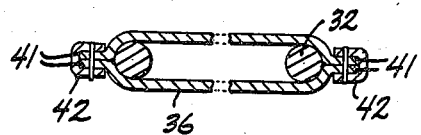
INVENTOR.
Thomas C. Gallagher
BY
ATTORNEYS.

Patented Sept. 2, 1941

2,254,647

UNITED STATES PATENT OFFICE 2,254,647

VEHICLE WINDOW SHADE

Thomas C. Gallagher, Tatum, N. Mex.

Application May 8, 1940, Serial No. 334,061

9 Claims. (Cl. 156—10)

The invention relates to improvements in vehicle window shades, and more particularly to folding window shades.

Direct sunlight shining thru vehicle windows, particularly vehicle side windows, even in winter, is very annoying and oftentimes dangerous.

The primary object of the invention is to provide a folding window shade that will exclude direct sunlight and permit ventilation of the vehicle.

Another object of the invention resides in the provision of a folding window shade having improved means for securing the shade against casual displacement from a set position.

A further object is to provide a folding window shade including main and auxiliary panels foldable so as to utilize the main panel alone or both panels.

A still further object is the provision of a window shade as described, which may be quickly folded and swung out of the way, for hand signaling, or at times when its presence at the window is not required.

Other objects and advantages of the invention will become apparent during the course of the following detailed description, taken in connection with the accompanying drawings forming a part of this specification, and in which drawings—

Figure 1 is an interior side view of the window shade applied to a vehicle side window.

Figure 2 is a perspective view of the frame of the window shade.

Figure 3 is an end view of the window shade applied to a vehicle window, the window being shown in vertical section substantially along the line 3—3 of Figure 1.

Figure 4 is a view similar to Figure 3 but showing the window shade reversed.

Figure 5 is a vertical sectional view of the window shade, taken substantially on the line 5—5 of Figure 2.

Figure 6 is an enlarged sectional detail view taken substantially on the line 6—6 of Figure 2.

Figure 7 is a sectional view taken substantially on the line 7—7 of Figure 5.

Figure 8 is an enlarged sectional detail view taken substantially on the line 8—8 of Figure 2.

Figure 9 is a sectional view taken substantially on the line 9—9 of Figure 5.

In the drawings, which for the purpose of illustration show only a preferred embodiment of the invention, and wherein similar reference characters denote corresponding parts thruout the several views, 15 designates a vehicle body portion, including a door 16 provided with a side window 17.

Secured to the vehicle body portion 15, as by ears 20, is a substantially U-shaped bracket 21 including a round metal bar 22 adjacent the upper end of the window 17. Encircling the bar 22 is a sleeve 23 slightly deformed, as by hammering or pressing, to provide sections 24 of oval or other non-circular shape which frictionally engage the bar to secure the sleeve against casual rotation from a set position and to permit intentional rotation for the purpose of adjustment. Figure 2 gives an exaggerated view of the deformed sections 24. If desired, the whole length or any part of the whole tube may be slightly deformed.

Fixed to the sleeve 23, as by welding 25, is a substantially U-shaped main wire frame 26, including a rod 27 approximately parallel to the bar 22. Encircling the rod 27 is a tube 28 slightly deformed, as by hammering or pressing, to provide sections 29 of oval or other non-circular shape which frictionally engage the rod 27 to secure the tube against casual rotation from a set position and to permit intentional rotation for the purpose of adjustment. Figure 2 gives an exaggerated view of the deformed sections 29. If desired, the whole length of the tube or any part thereof may be slightly deformed.

Fixed to the tube 28, as by welding 30, are eye wires 31 supporting a polygonal auxiliary wire frame 32 including spaced rods 33, 34 lying in a plane approximately parallel to the rod 27. These eye wires 31 are welded to the ends of the sleeve 28 and the rod 33 is welded to the frame 32, as shown in Figure 2.

Carried by the main and auxiliary frames 26, 32 are main and auxiliary panels 35, 36, which may be formed of suitable material to harmonize with the vehicle. In the example shown, the panel 35 is formed of flexible opaque sheet material extending around the tube 28 at fold 37, the marginal edges 38 of the sheet material being secured together outwardly of the frame 26 and sleeve 23, as by a binding strip 39. The panel 36 is formed of flexible opaque sheet material extending around the rod 33 at fold 40, the marginal edges 41 of the sheet material being secured together outwardly of the frame 32, as by a binding strip 42.

Referring to Figure 3, wherein one method of attaching the shade to the vehicle body portion 15 at the bracket 21 is shown, it will be noted that the main and auxiliary panels 35, 36 may be folded and swung upwardly and out of the way as shown by full lines, or may be moved downwardly, as by pulling the auxiliary panel 36, to a position wherein the unfolded panels 35, 36 cooperate to shield substantially the entire window 17, as shown by broken lines. Alternatively, the main and auxiliary panels 35, 36 may be swung downwardly relative to the bracket 21 from the position shown by full lines to a position wherein the main and auxiliary panels are disposed in folded side by side relation adjacent the upper portion of the window.

In another method of attaching the shade to the vehicle body portion 15 at the bracket 21, as shown in Figure 4, the main and auxiliary panels 35, 36, in reversed position, may be folded and swung upwardly and out of the way, as shown in full lines, or they may be swung downwardly, in either folded or unfolded relationship, to shield either the upper portion or substantially the entire window, as desired.

It will be noted that the auxiliary panel in its extended position is disposed in spaced overlapping relation to the main panel, in that the upper marginal side edge of the auxiliary panel adjacent the fold 40 extends above the lower marginal side edge of the main panel adjacent the fold 37, as clearly shown in Figure 5, whereby to exclude light rays, such as from the sun, when low.

It will also be noted, that, upon utilization of the main and auxiliary panels 35, 36 in their unfolded relationship, ventilation will occur because of the offset spaced disposition of the panels and because of the space between the vehicle body 15 and bar 22 adjacent the vehicle window. Ventilation is also provided at the ends and at the bottom of the shade.

Various changes may be made in the form of invention herein shown and described without departing from the spirit of the invention or the scope of the following claims.

I claim:

1. In a vehicle window shade, a bracket to be fixed adjacent the vehicle window, a main panel having opposite marginal side edges, means pivotally securing one of said side edges of the main panel to the bracket, an auxiliary panel having opposite marginal side edges, and offset hinge means pivotally securing one of said side edges of the auxiliary panel to the other of said side edges of the main panel for movement of the auxiliary panel between positions in planes spaced from opposite sides of the main panel.

2. In a vehicle window shade, a bar to be fixed adjacent the vehicle window, a main panel including a sleeve on the bar having a non-circular section frictionally engaging the bar whereby to secure the main panel against casual rotation from a set position and a rod spaced from the sleeve, and an auxiliary panel including a tube on the rod having a non-circular section frictionally engaging the rod whereby to secure the auxiliary panel against casual rotation from a set position.

3. In a vehicle window shade, a bar to be fixed adjacent the vehicle window, a sleeve on the bar including a non-circular section frictionally engaging the bar whereby the sleeve is secured against casual rotation from a set position, and a panel fixedly secured to the sleeve.

4. In a vehicle window shade, a bar to be fixed adjacent the vehicle window, a sleeve on the bar including a non-circular section frictionally engaging the bar whereby the sleeve is secured against casual rotation from a set position, a frame fixedly secured to the sleeve and a panel carried by the frame.

5. In a vehicle window shade, a bar to be fixed adjacent the vehicle window, a sleeve on the bar including a non-circular section frictionally engaging the bar whereby the sleeve is secured against casual rotation from a set position, a frame fixedly secured to the sleeve including a rod spaced from the bar, a tube on the rod including a non-circular section frictionally engaging the rod whereby the tube is secured against casual rotation from a set position, and a panel fixedly secured to the tube.

6. In a vehicle window shade, a bar to be fixed adjacent the vehicle window, a sleeve on the bar including a non-circular section frictionally engaging the bar whereby the sleeve is secured against casual rotation from a set position, a main frame fixedly secured to the sleeve including a rod spaced from the bar, a tube on the rod including a non-circular section frictionally engaging the rod whereby the tube is secured against casual rotation from a set position, a panel carried by the main frame, an auxiliary frame fixedly secured to the tube, and a panel carried by the auxiliary frame.

7. In a vehicle window shade, a bar to be fixed adjacent the vehicle window, a sleeve on the bar including a non-circular section frictionally engaging the bar whereby the sleeve is secured against casual rotation from a set position, a main frame fixedly secured to the sleeve including a rod spaced from the bar, a tube on the rod including a non-circular section frictionally engaging the bar whereby the tube is secured against casual rotation from a set position, a panel carried by the main frame, an auxiliary frame fixedly secured to the tube and including spaced rods disposed in a plane out of alignment with the main frame, and a panel carried by the auxiliary frame between said spaced rods.

8. In a shade for use in conjunction with a vehicle side window, a bracket to be fixed adjacent the window, a main opaque panel having opposite marginal side edges, means pivotally securing one of said side edges of the main opaque panel to the bracket, an auxiliary opaque panel having opposite marginal side edges, and offset hinge means pivotally securing one of said side edges of the auxiliary panel to the other of said side edges of the main panel with said auxiliary panel swingable between folded and extended positions relative to the main panel, said auxiliary panel, in its extended position, being disposed in overlapping relation to the main panel.

9. In a ventilating shade for use in conjunction with a vehicle side window, a bracket to be fixed adjacent the window, a main opaque panel having opposite marginal side edges, means pivotally securing one of said side edges of the main opaque panel to the bracket, an auxiliary opaque panel having opposite marginal side edges, and offset hinge means pivotally securing one of said side edges of the auxiliary panel to the other of said side edges of the main panel for movement of the auxiliary panel between folded and extended positions relative to the main panel, said auxiliary panel in its folded position being disposed in laterally spaced relation to one side of the main panel and in its extended position being disposed in spaced overlapping relation to the other side of the main panel whereby to permit the passage of air between said panels for ventilating purposes while preventing passage of the sun's rays therethrough.

THOMAS C. GALLAGHER.